April 11, 1961 W. BREY 2,979,106
PREPARATION OF COATED FABRIC MATERIAL
Filed Dec. 10, 1957 2 Sheets-Sheet 2

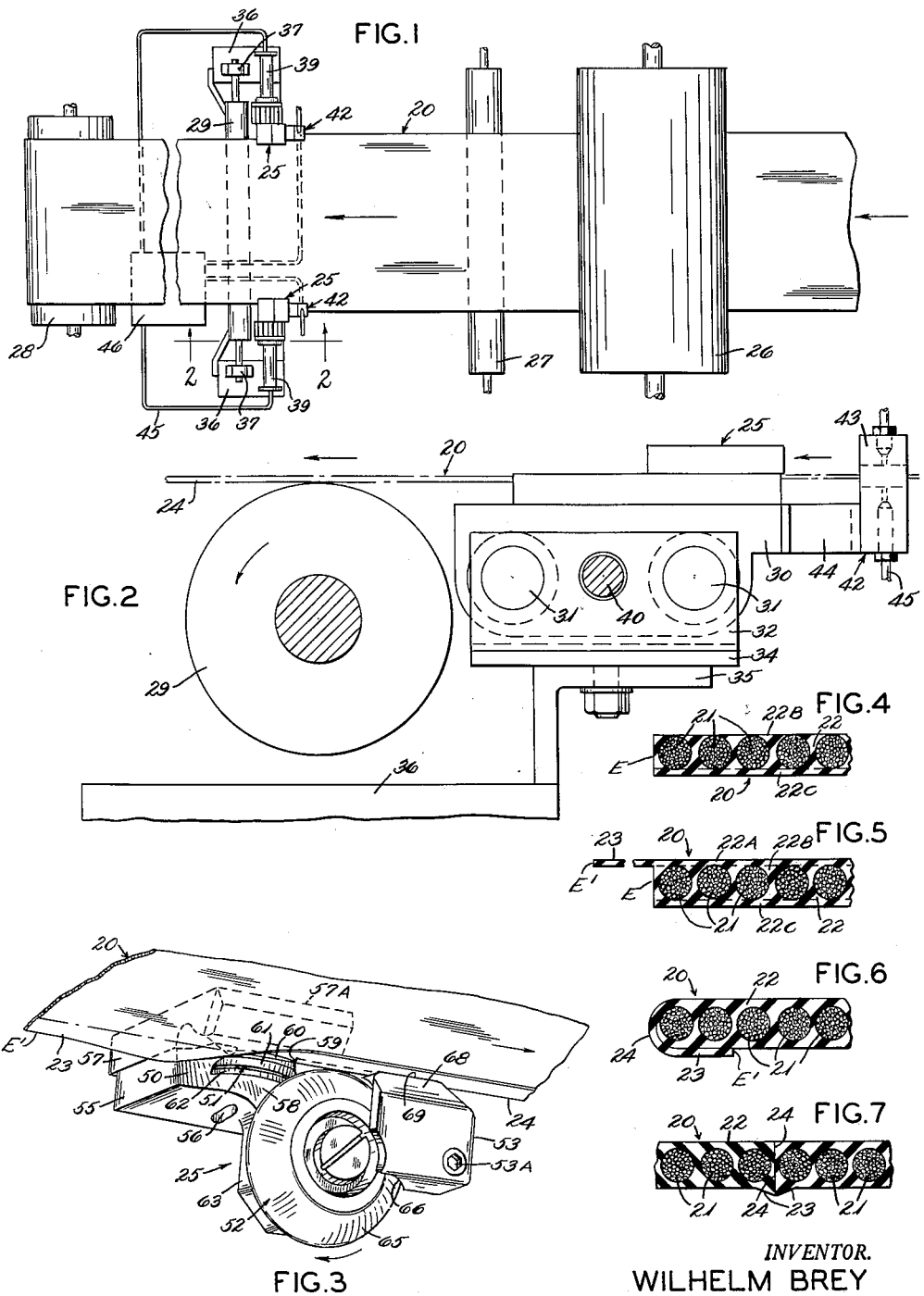

INVENTOR.
WILHELM BREY
BY
W. A. Fraser
ATTY.

United States Patent Office 2,979,106
Patented Apr. 11, 1961

2,979,106
PREPARATION OF COATED FABRIC MATERIAL

Wilhelm Brey, Cuyahoga Falls, Ohio, assignor to The Firestone Tire & Rubber Company, Akron, Ohio, a corporation of Ohio Filed Dec. 10, 1957, Ser. No. 701,864

5 Claims. (Cl. 154—1.8)

The present invention relates to the preparation of fabric material having a self-adhesive insulating coating and used in the manufacture of articles such as automotive tires. More particularly, the invention relates to special preparation and treatment of the edges of rubberized fabric material, so as to provide an improved splice when short strips of fabric material which have been cut on a predetermined bias angle are joined to form a continuous web.

Until recently in this art, continuous webs of bias-cut fabric material were formed by manually overlapping the ends of successive short strips and pressing the ends together. Such overlap splicing was costly and unless performed very accurately would also possibly contribute to irregularity and imbalance of the finished tire. However, there has recently been developed apparatus which automatically performs all functions necessary to butt join or splice the trailing end of one web of bias-cut material to the leading end of a following web of material without building up the bulk of the fabric in the area of the splice. Such apparatus requires that the end or outside cords of each fabric web be covered with a sufficient amount of rubber or other coating in a self-adhesive condition.

Therefore, it is an object of the present invention to provide improvements in the preparation and treatment of fabric material having a self-adhesive insulating coating for use in construction of automotive tires and the like.

It is a further object to provide improvements in apparatus for producing, as an article of manufacture, a web of fabric material having a self-adhesive insulating coating and specially prepared and shaped edges which readily permit short strips of the fabric material when bias-cut to be butt joined or spliced to form continuous webs for use in the construction of automotive tires and the like.

These and other objects of the invention, as well as the advantages thereof, will be apparent in view of the following detailed description considered with the attached drawings.

In the drawings:

Fig. 1 is a schematic plan view of an installation of apparatus according to the invention between the last roll of a calendering machine and the fabric wind up reel;

Fig. 2 is an enlarged view in elevation taken substantially on line 2—2 of Fig. 1;

Fig. 3 is a perspective view of a novel die element for contacting and shaping the specially prepared edges of the fabric;

Fig. 4 is a vertical sectional view of the fabric edge while on the calendering machine and prior to the application of an upper insulating skim coat or layer of rubber;

Fig. 5 is a vertical sectional view of the fabric edge after application and preparation of the upper insulating layer of coating;

Fig. 6 is a vertical sectional view of the fabric edge after contact and shaping by the die element shown in Fig. 3;

Fig. 7 is a vertical sectional view of an improved butt joint or splice made possible by the present invention;

Figure 8:
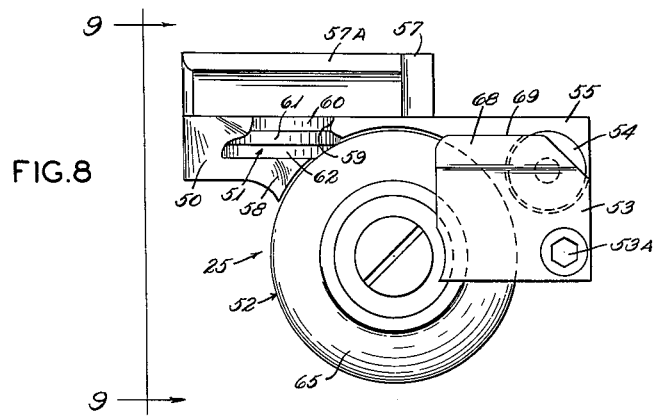
Fig. 8 is an elevation of the die element of Fig. 3.
Figure 9:
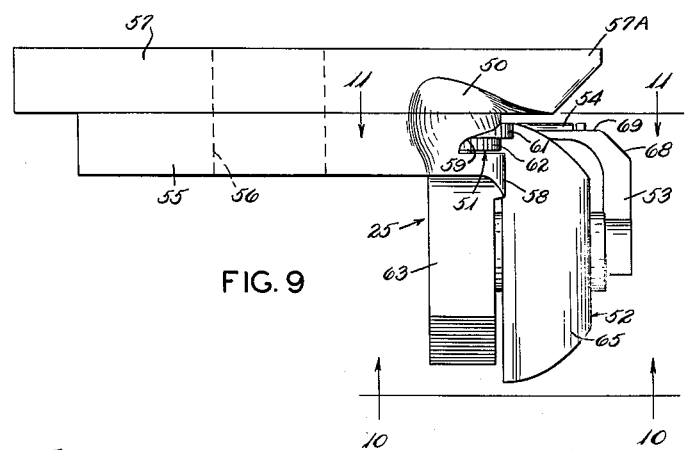
Fig. 9 is an end view of the die element taken as indicated on Fig. 8.
Figure 10:
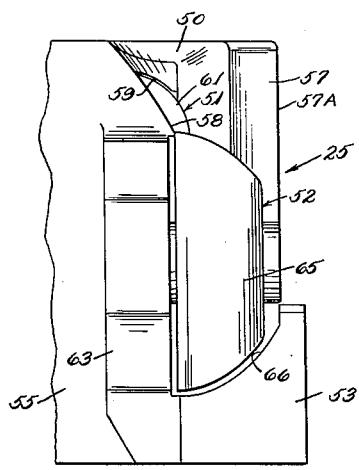
Fig. 10 is a fragmentary bottom view taken as indicated on Fig. 9.
Figure 11:
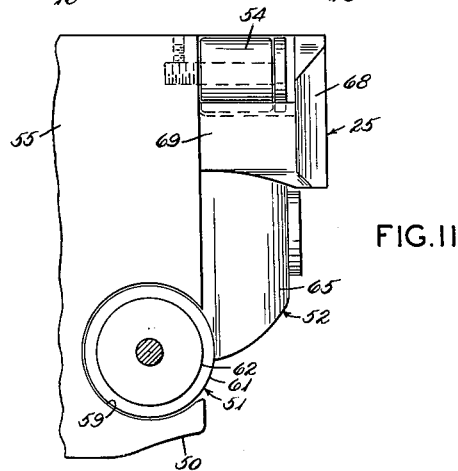
Fig. 11 is a sectional view taken substantially as indicated on line 11—11 of Fig. 9.

In the preparation of fabric materials for use as tire plies, the cord of rayon, nylon, cotton or similar materials are dipped in specially formulated liquid rubber compounds and tension dried. Rubberizing of the fabric then follows and is done on a rubber calender or calenders by applying individual strips (or skim coats) of rubber on each side of the fabric and squeezing the rubber and fabric between the calender rolls sufficiently to cause the rubber to flow between and about each cord, thereby affording uninterrupted rubber insulation of the cords as will be understood by those familiar with rubberizing by calendering cord tire fabric.

Referring to Figs. 4 and 5, the rubberized fabric material is indicated generally by the numeral 20 and includes the individual cords 21 and the insulating coating 22. In the finished form of the material 20, the separately applied layers of the coating 22 become bonded homogeneously around and between the cords due to the pressure of the calender rolls. However, for the purposes of understanding the present invention, the coating 22 is best described as having an upper layer 22A, a medial layer 22B and a lower layer 22C.

Referring specifically to Fig. 4, the medial layer 22B and the lower layer 22C are first applied. The outer edge E is then trued and squared by a suitable means such as a hot knife (not shown) on the calender unit so that the outer edges of layers 22B and 22C are coextensive and longitudinally aligned. Referring specifically to Fig. 5, the upper layer 22A is then applied. The outer edge E' of layer 22A which is then preferably trued and squared forms a fin 23. The fin 23 has a thickness which is preferably one-tenth to one-quarter the thickness of the composite material 20. The width of the fin, that is the distance between E and E', is preferably five to ten times the composite thickness of the material 20. In any event, the upper insulating layer 22A is applied so as to form a fin 23 of substantial width in relation to thickness.

After passage through the calender unit, the fin 23 is wrapped around or turned progressively under and bonded to the medial and lower layers 22B and 22C so that the outer edge 24 of the material 20 is shaped in the manner shown in Fig. 6.

Fig. 7 is intended to show a typical improved quality butt or splice made possible by the specially prepared edge 24 of the material 20. The substantial thickness of adhesive coating provided by bonding of the fin 23 to the medial and lower layers 22B and 22C ensures adhesion between the abutting edges of two strips of bias-cut material.

Referring to Fig. 1, it is preferred that both edges of a web of fabric material 20 be prepared simultaneously. Each fin 23 of the upper insulating layer is shaped and bonded to the medial and lower layers 22B and 22C by an individual edging die, indicated generally by the numeral 25. The individual die elements 25 for either side of the web 20 are identical except for being opposite hand.

After passage through the calender unit, the last roll of which is indicated at 26, the web 20 is drawn over a first idler support roll 27 by a wind up reel 28. A second idler support roll 29 is located behind the first to provide a tensioned span of the fabric material to which the edging dies are applied.

Referring to Fig. 2, each die 25 is carried by a guide or mounting block 30. Each block 30 is movably mounted on and stabilized by a pair of parallel slide rods 31. Each pair of slide rods 31 are mounted between a pair of end plates 32, mounted one on either end of a transverse base plate 34 carried on a flange 35. The flange 35 extends upwardly from a support stand 36. The second idler support roll 29 may be journaled in bearing blocks 37 carried on the support stand 36.

Each edging die 25 is moved transversely or laterally of the web of fabric material 20 by a conventional fluid-actuated cylinder 39 mounted on an end plate 32 and having an extensible shaft 40 connected to a slidable block 30.

The lateral movement of each edging die 25, in response to extension of retraction of each cylinder shaft 40, may be controlled by any suitable web edge position detector means located adjacent and one on either side of the tensioned span of fabric between the rolls 27 and 29 and indicated generally by the numeral 42. In one form of installation in which the improved edging dies 25 may be employed, the edge detector means 42 is as shown in U.S. Patent No. 2,794,444 issued June 4, 1957, to Frank J. Markey. However, other suitable detecting means including photo-electric cells and receivers could also be used.

The purpose of each edge detector means 42 is to position the edging die 25 in relation to the fin 23 and the edge E' of the web 20, as described in detail below. The detector head 42 is mounted on a bracket 44 extending to one side of a slidable block 30. Suitable piping 45 connects each detector head 43 with a common power source 46 (see Fig. 1) to supply actuating fluid to the cylinders 39.

An edging die 25 includes a plough surface 50, a horizontal roller 51, a vertical roller 52, a generally rectangular block 53 and a second vertical roller 54 to progressively turn the fin 23 down and around the edge E of the fabric web 20 forming an adhesive layer of substantial thickness. A die 25 also includes a bottom plate 55 adapted for secure attachment to the mounting block 30, as for example, by bolts (not shown) extending through one or more holes 56 on the under surface of the plate 55. Above the plate 55 is an upper block 57 having a portion 57A which overhangs and extends inwardly of the fabric web 20 above the fin 23.

The plough surface 50 extends from the face 58 of the bottom plate 55 and is gradually inclined toward the web 20. The surface 50 is also curved upwardly in a gradual arc of approximately 90°. Thus, the surface 50 turns the fin 23 downward from the initial horizontal position (see Fig. 5), around the edge E, to a position in which the fin 23 is substantially at right angles to the web 20.

The cylindrical roller 51 is rotatably mounted, with its axis at right angles to the plane of the web 20, in a pocket 59 of the face 58 of the plate 55. The roller 51 has three distinct portions. The diameter of the upper portion 60 of roller 51 is such that this portion of the roller is conterminous with the face 58 of the plate 55. The diameter of the medial portion 61 is larger than the diameter of portion 60 so that the fin 23 of the web 20 is turned further around the edge E to a position substantially parallel with the web 20. The diameter of the lower portion 62, is less than the diameter of portion 61 so that the roller 51 may be located close to the roller 52.

The larger roller 52 is rotatably mounted with its axis parallel and tangent to the plane of the web 20 on a flange 63 depending from the bottom plate 55. The outer surface 65 of the roller 52 is convexly tapered toward the web 20; that is, adjacent flange 63 the surface 65 is in a plane substantially parallel with the web 20. Away from the flange 63, inwardly of the web 20, the surface 65 becomes nearly vertical. The purpose of roller 52 and surface 65 is to substantially complete the turning of the fin 23 in an arc of 180° from the initial horizontal position.

The rectangular block 53 is mounted on the depending flange 63, as by a screw 53A and suitable dowel pins (not shown). The end of block 53 adjacent roller 52 is contoured as at 66 in approximate conformity with the shape of surface 65 so that the block 53 may be located closely thereto. The elongated upper surface 68 of the block 53 is preferably bevelled to provide a reduced area upper surface 69 in contact with the folded fin 23. The opposite end of the block 53 confines the roller 54 rotatably mounted on the face 58 of the plate 55 with its axis parallel and tangent to the plane of the web 20. The purpose of the top surface 69 and roller 54 is to urge the now folded fin into adhesive contact with the web 20.

As has been now described, an edging die 25 will efficiently and expeditiously prepare and shape a web of fabric material to form an edge having a self-adhesive insulating coating. The die 25 shown in Fig. 3 is "left hand"; that is, it is used to prepare and shape the left side of a fabric web moving away from the observer. The right hand side of such fabric web would be prepared by an identical die of opposite or right hand construction.

What is claimed is:

1. A die for shaping the edge area of a longitudinally moving web having a self-adhesive coating, said coating having a longitudinally aligned lower edge and an overlying thin fin extending laterally of said edge, comprising, a plate having a curved work surface gradually inclined toward the web, a first disc disposed on and near one end of said plate being in conterminous relation with said curved surface and having a peripheral edge portion in contact with said fin, a second disc on said plate disposed beneath and at substantially right angles with said first disc and having a peripheral edge portion in contact with said fin, and a member disposed near the other end of said plate having one end adjacent to said second disc and presenting an elongated upper surface in contacting relation to said fin, said plate surface, first disc, second disc and elongated member cooperating in such manner as to cause said fin to wrap around and under said lower edge into adherence with said web inwardly of said lower edge as the web moves across said die.

2. A die for shaping the edge area of a longitudinally moving web having a self-adhesive coating, said coating having a longitudinally aligned lower edge and an overlying thin fin extending laterally of said edge, comprising, a plate having a face parallel to said web and a curved surface inclined from said face toward said web, a first roller rotatably mounted in and disposed near one end of said face conterminous with said curved surface with its axis substantially at right angles to the plane of the web and having a peripheral edge portion in contact with said fin, a second roller rotatably mounted on said face below said first roller with its axis substantially parallel to the plane of the web and having a peripheral edge portion in contact with said fin, and a rectangular block disposed on and near the other end of said face adjacent to said second roller and beveled to present a reduced area upper surface in contact with said fin, said curved plate surface, first roller, second roller and rectangular block cooperating in such manner as to cause said fin to wrap around and under said lower edge into adherence with said web inwardly of said lower edge as the web moves across said die.

3. A die for shaping the edge area of a longitudinally moving web having a self-adhesive coating, said coating having a longitudinally aligned lower edge and an overlying thin fin extending laterally of said edge, comprising, a plate having a vertical face parallel to said web, a block disposed above said plate having an upper portion overhanging and extending inwardly of said web, a first surface on said plate curved and inclined away from said face toward said web in contact with said fin, a pocket in and near one end of said face behind and adjacent to said first surface, a first roller rotatably mounted in said pocket on a substantially vertical axis and having a peripheral edge portion in contact with said fin, a second roller rotatably mounted adjacent to said pocket on a substantially horizontal axis and having a peripheral edge portion in contact with said fin, and a rectangular block disposed on and near the other end of said face adjacent to said second roller and beveled to present a reduced area upper surface in contact with said fin, said curved plate surface, first roller, second roller and rectangular block cooperating in a manner to cause said fin to wrap around and under said lower edge into adherence with said web inwardly of said lower edge as the web moves across said die.

4. A die for shaping the edge area of a longitudinally moving web having a self-adhesive coating, said coating having a longitudinally aligned lower edge and an overlying thin fin extending laterally of said edge, comprising, a plate having a vertical face parallel to said web, a block disposed above said plate having an upper portion overhanging and extending inwardly of said web, a first surface on said plate curved and inclined away from said face toward said web in contact with said fin, a pocket in and near one end of said face behind and adjacent to said first surface, a first roller rotatably mounted in said pocket on a substantially vertical axis and having a peripheral edge portion in contact with said fin, a second roller rotatably mounted adjacent to said pocket on a substantially horizontal axis and having a peripheral edge portion in contact with said fin, a rectangular block disposed on and near the other end of said face adjacent to said second roller and beveled to present a reduced area upper surface in contact with said fin, and a third roller confined within said block at one end and having a substantially horizontal axis, said curved plate surface, fiirst roller, second roller, rectangular block and third roller cooperating in a manner to cause said fin to wrap around and under said lower edge into adherence with said web inwardly of said lower edge as the web moves across said die.

5. A die for shaping the edge area of a longitudinally moving web having a self-adhesive coating, said coating having a longitudinally aligned lower edge and an overlying thin fin extending laterally of said edge, comprising, a plate having a vertical face parallel to said web, a block disposed above said plate having an upper portion overhanging and extending inwardly of said web, a first surface on said plate curved and inclined away from said face toward said web in contact with said fin, a pocket in and near one end of said face behind and adjacent to said first surface, a first roller rotatably mounted in said pocket on a substantially vertical axis, said first roller having a surface in tangential contact with said fin, a second roller rotatably mounted adjacent to said pocket in a substantially horizontal axis, said second roller having a convexly tapered surface in tangential contact with said fin, a rectangular block disposed on and near the other end of said face adjacent to said second roller and beveled to present a reduced area upper surface in contact with said fin, and a third roller confined within said block at one end and having a substantially horizontal axis, said curved plate surface, first roller, second roller, rectangular block and third roller cooperating in such manner as to cause said fin to wrap around and under said lower edge into adherence with said web inwardly of said lower edge as the web moves across said die.

References Cited in the file of this patent

UNITED STATES PATENTS

| | | |
|---|---|---|
| 2,061,286 | Millett | Nov. 17, 1936 |
| 2,467,385 | Kamborian | Apr. 19, 1949 |
| 2,491,282 | Rowe | Dec. 13, 1949 |
| 2,576,121 | Kamborian | Nov. 27, 1951 |
| 2,667,908 | Kahborian | Feb. 2, 1954 |
| 2,701,003 | Kamborian | Feb. 1, 1955 |
| 2,702,067 | Goldberg | Feb. 15, 1955 |

UNITED STATES PATENT OFFICE
CERTIFICATE OF CORRECTION

Patent No. 2,979,106            April 11, 1961

Wilhelm Brey

It is hereby certified that error appears in the above numbered patent requiring correction and that the said Letters Patent should read as corrected below.

Column 2, line 53, after "butt" insert -- joint --; column 3, line 16, for "of", first occurrence, read -- or --; line 37, for "vedtical" read -- vertical --.

Signed and sealed this 21st day of November 1961.

(SEAL)
Attest:

ERNEST W. SWIDER            DAVID L. LADD
Attesting Officer            Commissioner of Patents

USCOMM-DC